March 10, 1931.  S. C. CRIPE  1,795,933
GLASS MELTING FURNACE
Filed Sept. 17, 1926  2 Sheets-Sheet 1
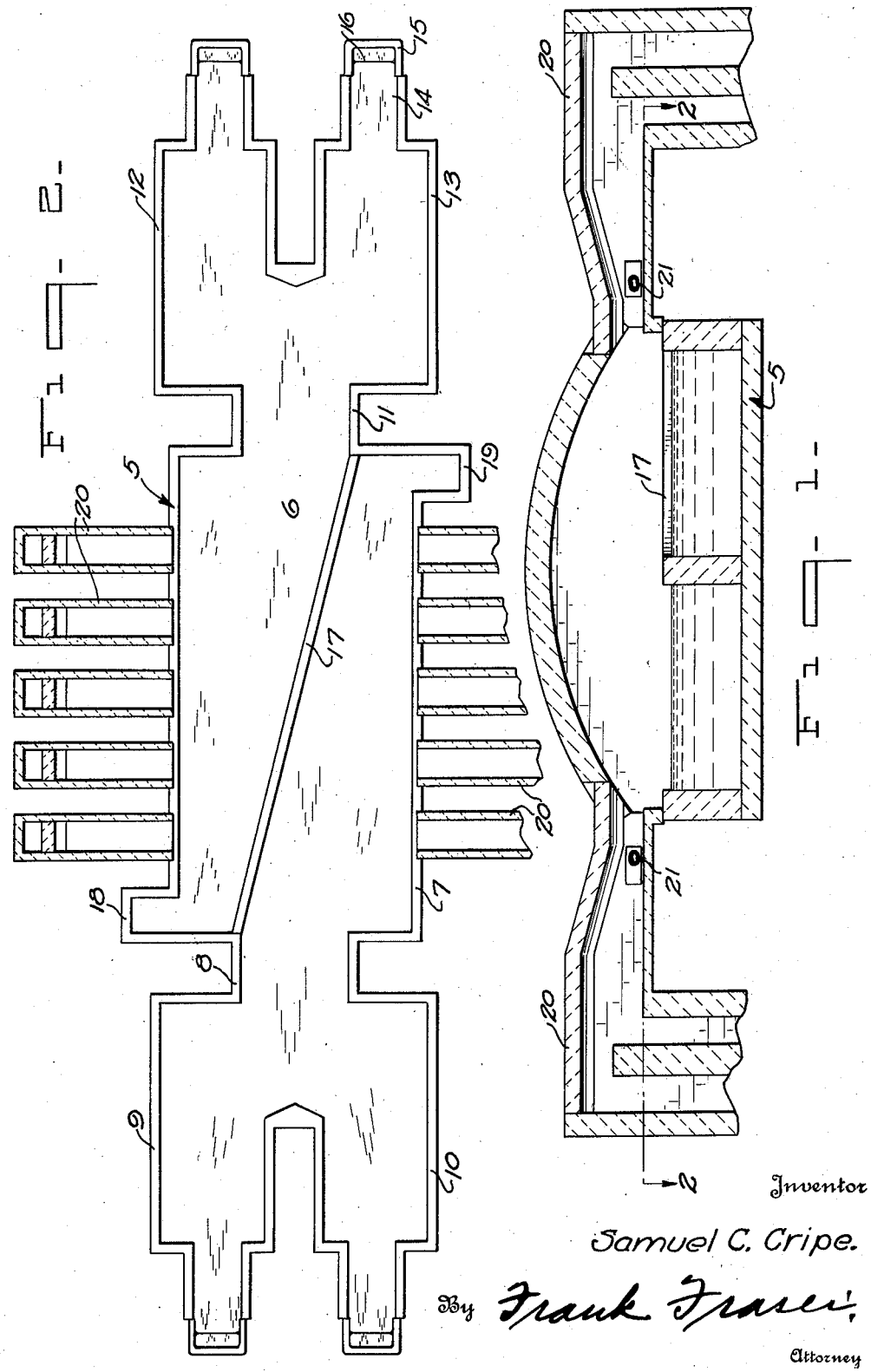
Inventor
Samuel C. Cripe.
By Frank Fraser,
Attorney

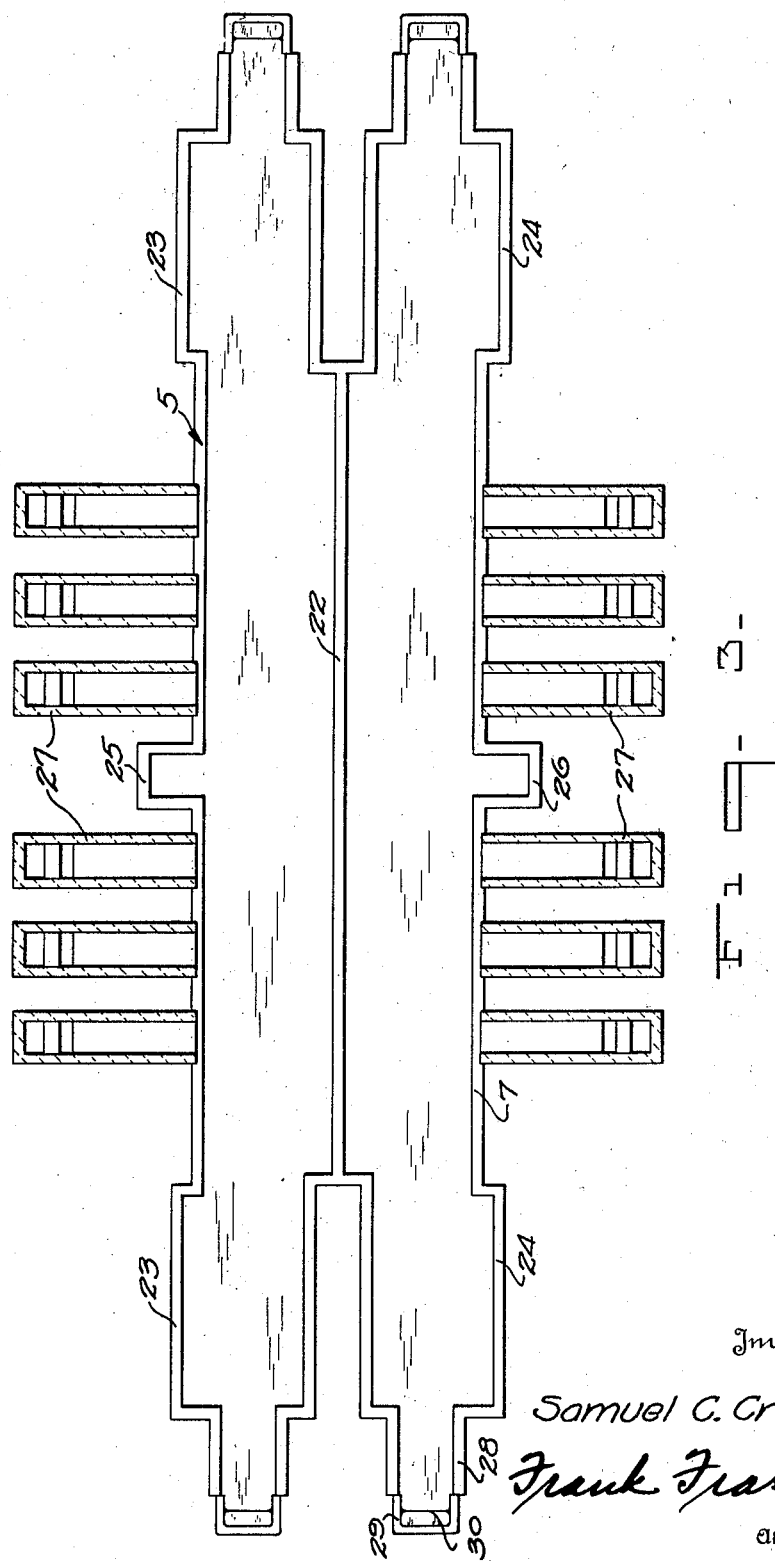

Patented Mar. 10, 1931

1,795,933

UNITED STATES PATENT OFFICE

SAMUEL C. CRIPE, OF TOLEDO, OHIO, ASSIGNOR TO LIBBEY-OWENS-FORD GLASS COMPANY, OF TOLEDO, OHIO, A CORPORATION OF OHIO

GLASS-MELTING FURNACE

Application filed September 17, 1926. Serial No. 136,054.

The present invention relates to glass apparatus, and has more particular reference to a novel glass melting furnace.

In certain types of glass melting furnaces, it is customary to introduce the batch which contains the ingredients from which the molten glass is produced into one end of the furnace, and then draw or otherwise form a sheet from the molten glass at the opposite end thereof. In some furnaces, only a single sheet is drawn therefrom, while in other furnaces two or more sheets may be simultaneously drawn. However, in these furnaces the sheet or sheets are drawn from one end only thereof. In such furnaces as above referred to, ports are usually arranged along both sides of the melting end of the tank. Means are provided for supplying gas and air, the gas usually being supplied through a pipe, while the air is drawn through a checkerwork which has been preferably heated by the exhaust gases issuing from the opposite side of the furnace. At intervals, the flame is reversed, that is, the flame is stopped on one side and is started on the opposite side so that the glass is being heated from flame supplied alternately from one side and then the other.

An important object of the present invention is to provide an improved furnace wherein a plurality of sheets may be simultaneously drawn or otherwise formed from the opposite ends thereof.

Another object of the invention is the provision of such an improved furnace which is of an exceedingly economical construction, and which will consume substantially the same amount of heat as is now being used in those types of furnaces referred to hereinabove, wherein one or more sheets are drawn from a single end thereof.

A further object of the invention is to provide a tank furnace including a melting tank having heating means associated therewith, the glass batch ingredients being introduced into the melting tank at the opposite sides thereof, and means being provided for keeping separated the glass batch ingredients introduced into the opposite sides of said melting tank together with the molten glass produced therefrom and for directing the said molten glass towards the opposite ends of the furnace.

It is the aim of the present invention to provide a furnace which will have a greater output than prior art machines without the necessity of increasing to any considerable degree the heat necessary to properly condition the glass. This will not only result in the production per machine of a greater quantity of glass, but will also result in the saving of both time and labor, and one furnace will produce the same quantity of glass as has heretofore been produced by two and sometimes four furnaces of prior art design. Instead of introducing the batch into one end of the furnace and then drawing or otherwise forming the sheet from the opposite end thereof, I propose to introduce the batch into the furnace at a point substantially intermediate the ends thereof, and subsequently form the glass into sheets by drawing or flowing the same simultaneously from the opposite ends of the furnace.

Other objects and advantages of the invention will become apparent during the course of the following description when taken in connection with the accompanying drawings.

In the drawings wherein like numerals are employed to designate like parts throughout the same.

Fig. 1 is a transverse sectional view through an improved furnace constructed in accordance with the present invention.

Fig. 2 is a horizontal section taken on line 2—2 of Fig. 1, and

Fig. 3 is a section of a somewhat modified form of the present invention.

Referring first to Figs. 1 and 2, the numeral 5 designates in its entirety an improved tank furnace provided in accordance with the present invention, and adapted to contain a mass of molten glass 6. The furnace 5 comprises a central portion or melting tank 7 in which the melting process is carried out. Communicating with one end of the melting tank 7, by means of a restricted opening or neck 8, are spaced refining chambers 9 and 10, while communicating with the opposite end of the melting tank by means of a restricted opening or neck 11 are similar refining chambers 12 and 13. Communicating with each of the refining chambers is a cooling chamber 14 and draw pot or working receptacle 15. The molten glass 6 flows from the melting tank 7 through the refining chambers into the cooling chambers 14 and subsequently out of the cooling chambers into the shallow draw pots 15 from which it may be drawn or otherwise formed into glass sheets 16 or into any other kind of glassware. Extending longitudinally and diagonally within the melting tank 7 is a partition wall 17 which projects slightly above the glass level within the tank, and not only serves to divide the tank longitudinally, but also causes the molten glass to flow from the melting tank towards the opposite ends of the furnace.

The batch, which comprises the ingredients from which the glass is produced, is preferably introduced into the melting tank 7 through open compartments or dog houses 18 and 19 arranged in staggered relation at opposite sides of the furnace. The batch is subjected to the action of the flames which causes the batch to melt to produce the molten glass 6. As the glass is continuously or substantially continuously drawn off or otherwise removed from the draw pots 15, the glass gradually moves towards the opposite ends of the furnace. This permits the molten glass to become refined and in condition for working.

A plurality of ports 20 are arranged along both sides of the melting tank 7, and the air for combustion purposes is drawn through these ports. The number of ports illustrated is not to be taken as a limitation of the number of ports which can be efficiently used. The gas is fed into the ports through suitable burners 21, and when this gas combines with the air entering through the ports, it will form a flame which passes into the furnace to melt the batch.

In the operation of the furnace the flame issues into the furnace alternately first from the ports at one side of the furnace and then from the ports at the opposite side thereof, so that the glass is being heated from flame supplied alternately from one side and then the other.

The batch introduced into the dog house 18 is first reduced by the flames to a mass of molten glass which flows first into the refining chambers 12 and 13, and subsequently through the cooling chambers 14 into the draw pots 15 associated therewith, while the batch fed into the dog house 19, after being melted, will flow in the opposite direction through the refining chambers 9 and 10 and cooling chambers 14 into the draw pots 15 associated therewith. A sheet 16 can then be simultaneously drawn from each of the draw pots 15 or the sheets can be formed in any other desired manner such as by flowing the glass from the draw pots to rolling mechanism. The glass can also be worked into various other kinds of glassware or glass articles as desired. The partition wall 17 serves not only to divide the melting tank longitudinally, but also acts to direct the flow of molten glass in the desired directions, and further, the wall 17 keeps separated the glass batch ingredients introduced into the opposite sides of the melting tank together with the molten glass produced therefrom so that there is actually created two independent pools of molten glass, one flowing to one end of the furnace and the other to the opposite end. The drawing operation at either end of the furnace can be stopped whenever desired without affecting the opposite end. If desired, different colored glass can be produced within the furnace, the partition wall 17 serving to separate the different colored glass and preventing the mixing thereof.

In Fig. 3, wherein has been disclosed a somewhat modified form of the present invention, the melting tank 7 of the furnace 5 is somewhat longer than the melting tank shown in Figs. 1 and 2, and is divided longitudinally by means of a partition wall 22. Communicating with the opposite ends of the melting tank 7 at opposite sides of the partition wall 22 are the refining chambers 23 and 24. Positioned at opposite sides of the melting tank, intermediate the ends thereof, are the dog houses 25 and 26 through which the batch is introduced into the melting tank. The batch is adapted to be melted by the flames entering the furnace through the ports 27, an equal number of which are preferably arranged at opposite sides of the dog houses. The molten glass is adapted to flow through the refining chambers 23 and 24 into cooling chambers 28, and then out of the cooling chambers into the draw pots or working receptacles 29 from which the sheets 30 may be drawn upwardly or otherwise formed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a furnace including a tank adapted to contain a mass of molten glass, means whereby sheets of glass may be simultaneously drawn from the opposite ends of said furnace and means arranged within and spaced from the opposite sides of said tank for directing the molten glass towards the opposite ends thereof.

2. In sheet glass apparatus, a furnace including a melting tank, means whereby the ingredients from which the glass is made may be introduced into the tank at opposite sides thereof, means for reducing the ingredients to a mass of molten glass, and means arranged within said melting tank and extending longitudinally thereof for directing the molten glass to flow towards the opposite ends thereof from which it may be removed.

3. In a furnace, a melting tank into which the ingredients from which the glass is made are introduced, means for reducing the ingredients to a mass of molten glass, means arranged within said melting tank and extending longitudinally thereof for causing the molten glass to flow towards the opposite ends of the furnace, and means whereby a plurality of sheets may be simultaneously drawn from the opposite ends of said furnace.

4. In a furnace, a melting tank adapted to contain a mass of molten glass, means for dividing said tank longitudinally, and means whereby a plurality of sheets may be simultaneously drawn from opposite ends of the furnace.

5. In a furnace, a melting tank, means for dividing the interior of the tank, means whereby the ingredients from which the glass is made may be introduced into the tank at opposite sides of the said dividing means, means for reducing the ingredients to a mass of molten glass, and means whereby a plurality of sheets may be simultaneously drawn from opposite ends of the furnace at opposite sides of said dividing means.

6. In a glass melting furnace, a melting tank adapted to contain molten glass, means for dividing the interior of said tank longitudinally to create a pair of separated pools of molten glass therein and for directing the glass to flow from said pools into opposite ends of the furnace.

7. In a glass melting furnace, a melting tank, means at the opposite sides of said tank for receiving the glass batch ingredients, heating means associated with the melting tank for reducing the batch ingredients to a mass of molten glass, and means arranged within said tank and extending longitudinally thereof for directing the flow of glass towards the opposite ends of the furnace.

8. In a glass melting furnace, a melting tank, means at the opposite sides of said tank intermediate its ends through which the glass batch ingredients may be introduced, means for melting the batch ingredients to form molten glass, and means for keeping separated the batch ingredients introduced into the opposite sides of said tank and for directing the molten glass produced therefrom toward opposite ends of said tank.

9. In a glass melting furnace, a melting tank, means at the opposite sides of said tank for receiving the glass batch ingredients, heating means associated with said tank for melting the batch ingredients to form molten glass, and means arranged within said tank and extending longitudinally thereof for keeping separated the glass batch ingredients introduced into the opposite sides of the tank together with the molten glass produced therefrom and for directing the flow of molten glass toward opposite ends of the furnace.

10. In a glass melting furnace, a melting tank, means at the opposite sides of said tank for receiving the glass batch ingredients, heating means associated with said tank for melting the batch ingredients to form molten glass, a plurality of refining tanks communicating with each end of the melting tank, a working receptacle associated with each refining tank, and means within said melting tank for directing the flow of molten glass to opposite ends thereof from which it passes through the refining tanks into the working receptacles.

11. In a glass melting furnace, a melting tank, means at the opposite sides of said tank for receiving the glass batch ingredients, heating means associated with said tank for melting the batch ingredients to form molten glass, a plurality of refining tanks communicating with each end of the melting tank, a working receptacle associated with each refining tank, and means extending longitudinally within the melting tank for keeping separated the batch ingredients introduced into the opposite sides thereof together with the molten glass produced therefrom and for causing the flow of said molten glass toward the opposite ends thereof from which it passes through the refining tanks into the working receptacles.

Signed at Toledo, in the county of Lucas and State of Ohio, this 15th day of September, 1926.

SAMUEL C. CRIPE.